(12) United States Patent
Chalifoux et al.

(10) Patent No.: US 7,561,776 B2
(45) Date of Patent: Jul. 14, 2009

(54) METHOD OF PREVENTING HYDROGEN DARKENING OF OPTIC FIBRE

(75) Inventors: Gerald V Chalifoux, Sherwood Park (CA); Robert B Logan, Edmonton (CA)

(73) Assignee: Petrospec Engineering Ltd., Edmonton (CA)

( * ) Notice: Subject to any disclaimer, the term of this patent is extended or adjusted under 35 U.S.C. 154(b) by 197 days.

(21) Appl. No.: 11/289,667

(22) Filed: Nov. 29, 2005

(65) Prior Publication Data

US 2007/0122104 A1    May 31, 2007

(51) Int. Cl.
*G02B 6/00* (2006.01)
(52) U.S. Cl. .................... 385/147; 385/141; 385/12; 250/227.14; 250/227.24; 250/227.28
(58) Field of Classification Search ................ 385/147, 385/141, 12; 356/44; 250/227.14, 227.24, 250/227.28
See application file for complete search history.

(56) References Cited

U.S. PATENT DOCUMENTS

| 3,961,185 | A | | 6/1976 | Brokenshire et al. |
|---|---|---|---|---|
| 4,612,810 | A | | 9/1986 | Martens |
| 5,047,521 | A | * | 9/1991 | Fujii et al. ............... 536/28.55 |
| 5,093,880 | A | * | 3/1992 | Matsuda et al. ............ 385/100 |
| 5,113,070 | A | | 5/1992 | Smith |
| 5,231,687 | A | * | 7/1993 | Handley .................... 385/139 |
| 5,275,038 | A | | 1/1994 | Sizer et al. |
| 5,371,720 | A | | 12/1994 | Cuomo |
| 5,570,449 | A | * | 10/1996 | Hutchinson et al. ......... 385/134 |
| 5,872,876 | A | * | 2/1999 | Kluth et al. .................. 385/12 |
| 6,434,302 | B1 | * | 8/2002 | Fidric et al. .................. 385/43 |
| 6,531,694 | B2 | * | 3/2003 | Tubel et al. ............ 250/227.14 |
| 6,563,970 | B1 | | 5/2003 | Bohnert et al. |
| 6,630,658 | B1 | | 10/2003 | Bohnert et al. |
| 2005/0236161 | A1 | * | 10/2005 | Gay et al. .................... 166/380 |
| 2007/0133961 | A1 | * | 6/2007 | Fairbanks et al. ........... 392/301 |

FOREIGN PATENT DOCUMENTS

CA    2 323 042    6/2000
DE    43 37 402    4/1927

* cited by examiner

*Primary Examiner*—James P Hughes
(74) *Attorney, Agent, or Firm*—Christensen O'Connor Johnson Kindness PLLC

(57) ABSTRACT

A method of preventing hydrogen darkening of optic fiber, which includes a step of providing a protective barrier of hydrogen free flowing gas around the optic fiber, such that the flowing gas sweeps away hydrogen.

5 Claims, 2 Drawing Sheets

METHOD OF PREVENTING HYDROGEN DARKENING OF OPTIC FIBRE

FIELD OF THE INVENTION

The present invention relates to a method of preventing hydrogen atoms from reacting with and darkening glass optic fibre.

BACKGROUND OF THE INVENTION

Optic fibre is used in oil and gas wells to transmit light waves carrying signals to surface. Hydrogen is invariably present in the hydrocarbon environment of oil and gas wells. At temperatures above 170 degrees Celsius, optic fibre is susceptible to attack from hydrogen atoms. The hydrogen atoms penetrate protective coverings and react with the optic fibre. This results in a degradation of the signals due to scattering of the light waves. This signal degradation has come to be known as "hydrogen darkening". Canadian Patent 2,323, 042 discloses a method of reducing the time until hydrogen darkening occurs by placing the optic fibre within a tube containing a protective liquid.

SUMMARY OF THE INVENTION

According to the present invention there is provided a method of preventing hydrogen darkening of optic fibre, which includes a step of providing a protective barrier of hydrogen free flowing gas around the optic fibre, such that the flowing gas sweeps away hydrogen atoms.

BRIEF DESCRIPTION OF THE DRAWINGS

These and other features of the invention will become more apparent from the following description in which reference is made to the appended drawings, the drawings are for the purpose of illustration only and are not intended to in any way limit the scope of the invention to the particular embodiment or embodiments shown, wherein.

DETAILED DESCRIPTION OF THE PREFERRED EMBODIMENT

The preferred method of preventing hydrogen darkening of optic fibre will now be described with reference to FIG. 1 through 3.

Figure 3:
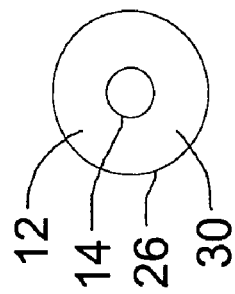
FIG. 3 is a detailed section view of optic fibre used in the first installation illustrated in FIG. 1 and the second installation illustrated in FIG. 2.

Referring to FIG. 3, the method provides a protective barrier 12 of substantially hydrogen free flowing gas around the optic fibre 14, such that the flowing gas sweeps away hydrogen. Referring to FIG. 1, a gas supply 16 is provided as the source of flowing gas. A flow rate of between 2 and 50 standard cubic feet per day has been found to be sufficient, depending on the conditions. In addition, the flowing gas may be provided in an intermittent, rather than continuous flow, to conserve gas and energy, in suitable situations. The gas passes through a metering or control valve 18, and through a pressure gauge 20 that also acts as a bleed off point. This allows the gas pressure to be monitored and controlled. The gas is then passed through another valve 22, and is an optic fibre 14 is then encased in tubular body 26 at junction 25 that is then strung out through a wellhead 27 and down a well 28. The details of this can be seen in FIG. 3, where an annulus 30 is defined between optic fibre 14 and tubular body 26, such that the flowing gas passes along annulus 30 to form protective barrier 12. The information collected downhole is then passed back up, through junction 25, and into junction box 24, where the collected information is passed on to a fibre optic SRU (not shown).

Figure 1:
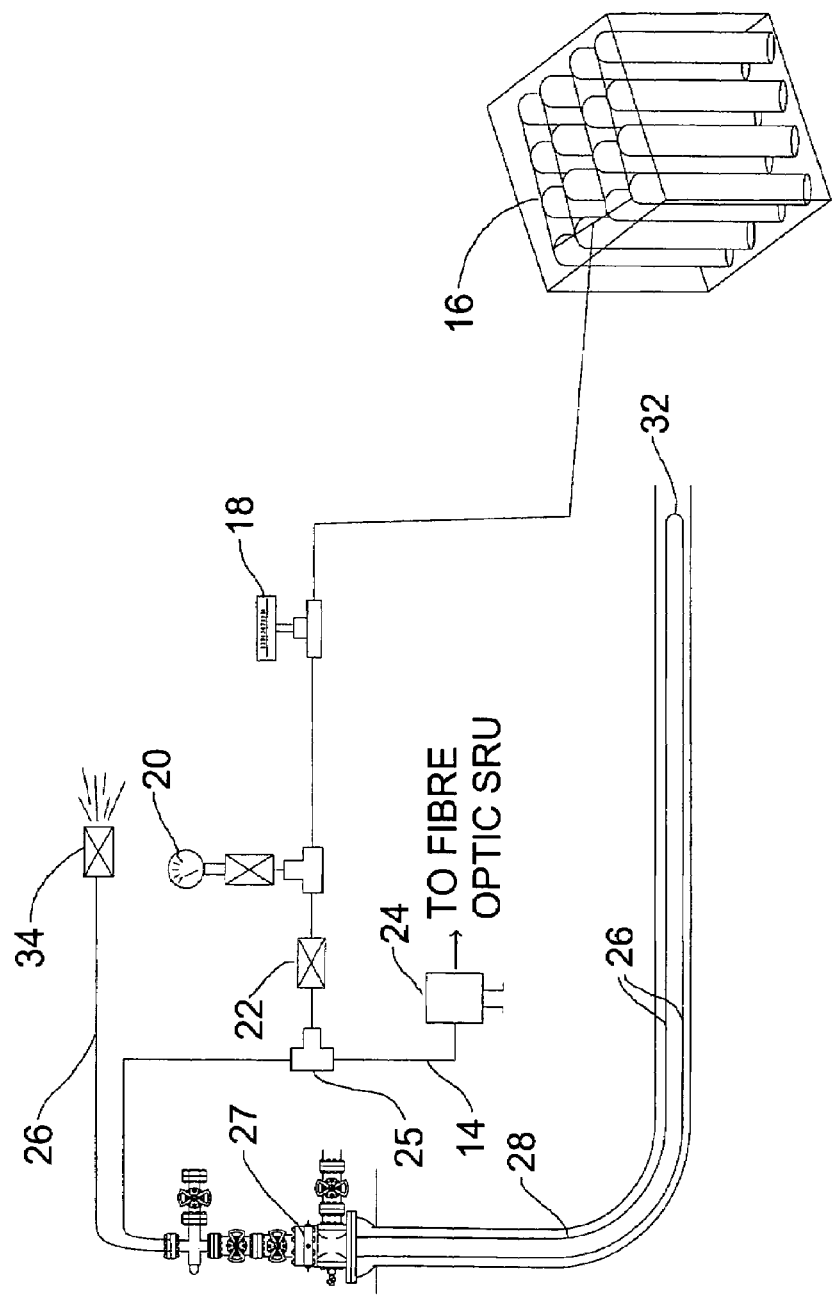
FIG. 1 is a first installation illustrating the preferred method of preventing hydrogen darkening of optic fibre in accordance with the teachings of the present invention.
Figure 2:
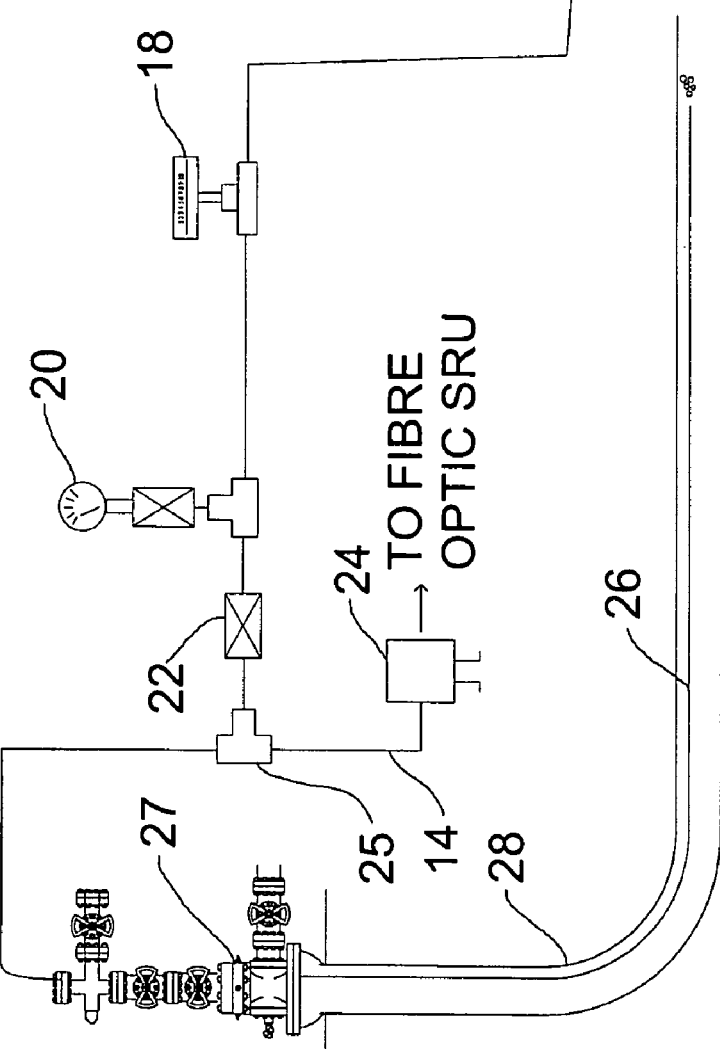
FIG. 2 is a second installation illustrating the preferred method of preventing hydrogen darkening of optic fibre in accordance with the teachings of the present invention.

Referring to FIG. 1, there may be a turn-around sub 32 that allows tubular body 26 to be brought back to the surface, where the gas is bled off to atmosphere through valve 34. Alternatively, referring to FIG. 2, the gas may be bled off downhole, and allowed to dissipate into the reservoir.

Examples of suitable flowing gases include air, nitrogen, flourine, helium, argon, oxygen, neon, krypton, xenon, radon, carbon monoxide, carbon dioxide, or a combination of the same. The flowing gas may also contain hydrogen scavenging additives, such as carbon tetrachloride, perfluorohexane, potasssium iodate, or a combination of the same.

An oil and gas well has been chosen for purposes of illustration, it will be appreciated that the same method can be employed in any hydrocarbon environment. For example, this method may have wide application in oil and gas processing facilities.

In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be one and only one of the elements.

It will be apparent to one skilled in the art that modifications may be made to the illustrated embodiment without departing from the spirit and scope of the invention as hereinafter defined in the Claims.

What is claimed is:

1. A method of preventing hydrogen darkening of optic fibre, comprising the step of:
   providing optic fibre within a protective tubular body, an annulus being defined between the optic fibre and the protective tubular body;
   inserting the protective tubular body through a well head and down into a hydrocarbon producing well;
   circulating a protective barrier of substantially hydrogen free flowing gas along the annulus around the optic fibre, such that the flowing gas sweeps away hydrogen, the hydrogen free flowing gas having hydrogen scavenging additives to remove hydrogen from the free flowing gas before the hydrogen has an opportunity to come into contact with the optic fibre.

2. The method as defined in claim 1, the flowing gas being selected from air, nitrogen, fluorine, helium, argon, oxygen, neon, krypton, xenon, radon, carbon monoxide, carbon dioxide, or a combination of the same.

3. The method as defined in claim 1, the hydrogen scavenging additives being selected from carbon tetrachloride, perfluorohexane, potassium iodate or a combination of the same.

4. The method of claim 1, wherein the flowing gas comprises a flow rate of between 2 and 50 standard cubic feet per day.

5. The method of claim 1, wherein the flowing gas comprises an intermittent flow of substantially hydrogen free gas.

* * * * *